UNITED STATES PATENT OFFICE.

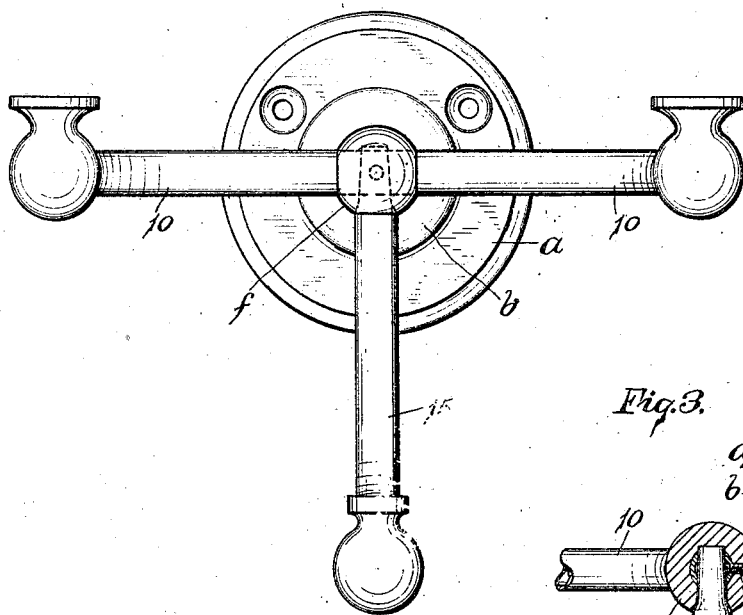
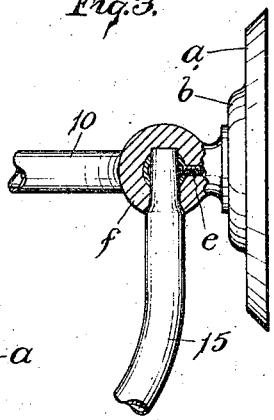
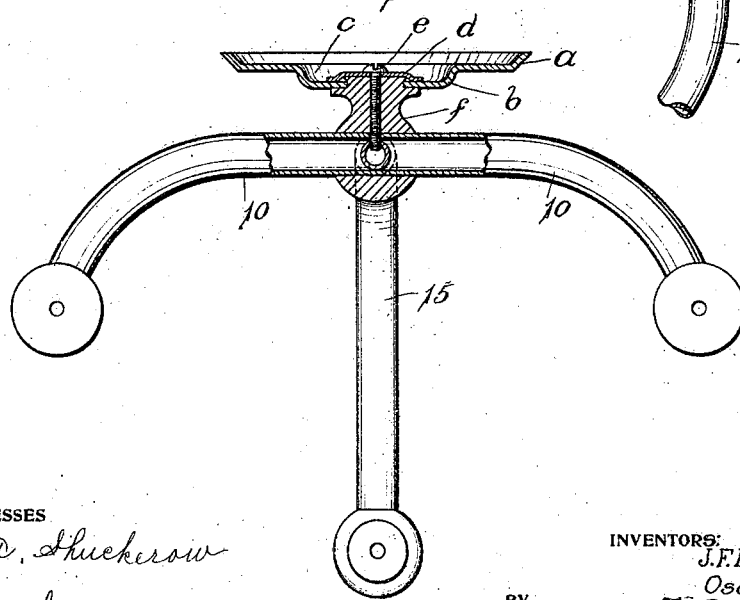

OSCAR MOBERG AND JOSEPH F. LAMB, OF NEW BRITAIN, CONNECTICUT, ASSIGNORS TO LANDERS, FRARY & CLARK, OF NEW BRITAIN, CONNECTICUT, A CORPORATION OF CONNECTICUT.

BATH-ROOM FIXTURE.

1,059,554.  Specification of Letters Patent.  Patented Apr. 22, 1913.

Application filed June 7, 1912.   Serial No. 702,374.

*To all whom it may concern:*

Be it known that we, OSCAR MOBERG and JOSEPH F. LAMB, citizens of the United States, and residents of New Britain, in the county of Hartford and State of Connecticut, have invented certain new and useful Improvements in Bath-Room Fixtures, of which the following is a specification.

The object of this invention is to produce a device of the character specified having features of novelty and advantage in its construction, and the particular object of the invention is to simplify and strengthen the construction of devices of this kind.

Referring to the drawings—Figure 1 is a front elevation of a device embodying our invention. Fig. 2 is a plan view of the same with parts shown in section. Fig. 3 is a detail view in section side elevation.

Referring to the drawings *a* denotes a base by which the fixture is attached to a suitable supporting surface having a central raised boss *b* forming a recess *c* in the back of the base. A stud *f* having a spherical head into which the various bracket arms 10, 10, and 15 are fitted has a flange *f'* which rests against the front of the base and a stem *g* which passes through the base, and is preferably riveted over to securely attach the stud to the base. The washer *d* which is of about the same diameter as the flange *f'*, is recessed to receive the riveted end of the stem so that it may have a bearing against the base opposite to the flange, and the screw *e* whose head takes a bearing on the washer *d* is threaded into the stem to clamp the base between the flange *f'* and the washer. The screw also extends through the stem and through one wall of the lateral bracket arms 10, 10, thus preventing them from twisting, and into the end of the depending bracket arm 15, mechanically securing all of the parts of the complete device firmly and securely together. It will be observed that owing to this construction the riveting over of the end of the stem *g* might be dispensed with.

The lateral arms 10, 10 are preferably formed from a single piece of tubular stock of even diameter throughout, bent to shape, and passed through an aperture in the stud *f*.

In the underside of the stud a socket is formed to receive the end of the depending bracket arm 15. This socket tapers from the full diameter of the bracket arm 15 to a diameter slightly less than the inside diameter of the stock from which the bracket arms 10, 10 are made, the lateral arms 10, 10 being apertured to form a continuation of this socket. The end of the bracket arm 15 is tapered and sized to fit snugly within this socket, filling the hole cut through the lateral bracket arms 10, 10, and is preferably brazed in position to securely unite the parts. As above described, the screws *e* extending axially through the stud from the rear of the base passes through the wall of the lateral bracket arms 10, 10 and is threaded into the end of the bracket arm 15 to mechanically secure all the parts in place. It will thus be seen that by reducing the end of the depending bracket arm 15, it is not necessary to sever the lateral arms 10, 10, thus preserving to a considerable extent the strength and rigidity of these lateral arms; also that by securing the end of the depending arm 15 it can be forced snugly into its seat and rigidly positioned. The mechanical attachment of the lateral and depending bracket arms to the stud by the screw increases the security and rigidity of the complete structure, and while we prefer to braze these bracket arms into their sockets, this may be omitted if desired. The base is also greatly strengthened by being clamped by the screw between the washer and the flange or shoulder on the stud.

As a result of this construction we have been able to produce a device of the character described characterized by unusual strength and rigidity of construction.

We claim as our invention:—

1. In a device of the character described, a base, a bracket arm carried thereby and provided with a socket, a second bracket arm arranged at an angle to the first and having a reduced end adapted to fit in said socket, and means for securing said end in said socket.

2. In a device of the character described, a base, a stud secured thereto, a bracket arm passing through said stud, a socket in said stud and bracket arm, a second bracket arm having a reduced end adapted to fit within said socket, and means for securing said bracket arms in position in said stud.

3. In a device of the character described, a base, a stud mounted thereon having a lateral aperture, a member passing through said aperture and fitting closely within it and having its ends oppositely extended to form lateral bracket arms, a socket in said stud whose axis intercepts the axis of said member, and whose diameter in that part which extends through said lateral bracket arm is less than the diameter thereof, a second bracket arm having a reduced end adapted to fit within said socket, and means for securing said bracket arms in said stud.

4. In a device of the character described, a base, a stud mounted thereon having a lateral aperture, a member passing through said aperture and fitting closely within it and having its ends oppositely extended to form lateral bracket arms, a socket in said stud whose axis intercepts the axis of said member, and whose diameter in that part which extends through said lateral bracket arm is less than the diameter thereof, a second bracket arm having a reduced end adapted to fit within said socket, and a screw extending through said stud and into both of the bracket arms.

5. A device of the character described comprising a base, a stud secured to and projecting from the front thereof and having a transverse aperture, a socket opening into it, the walls of the socket being slightly tapered, a lateral bracket arm extending through the aperture and itself apertured in alinement with the socket, and a bracket arm having its end sized and shaped to fit into said socket and extend through the aperture in the lateral bracket arm, and means for securing said bracket arms in position.

6. A device of the character described comprising a base, a stud secured to and projecting from the front thereof and having a transverse aperture, a socket opening into it, the walls of the socket being slightly tapered, a lateral bracket arm extending through the aperture and itself apertured in alinement with the socket, and a bracket arm having its end sized and shaped to fit into said socket and extend through the aperture in the lateral bracket arm, and a screw passing through said stud and through a wall of the bracket arm into the end of the depending bracket arm.

7. In a device of the character described, a base, a stud provided with a stem passing through the base and a flange bearing against the front thereof, a washer fitting against the rear of the base opposite the flange, bracket arms fitting into sockets in the head of the stud, and a screw passing through said washer and base having threaded engagement with the stem and extending through said stem into threaded engagement with the bracket arms.

OSCAR MOBERG.
JOSEPH F. LAMB.

Witnesses:
WILLIAM E. BAKER,
JAMES E. USHER.